Figures 1, 2:
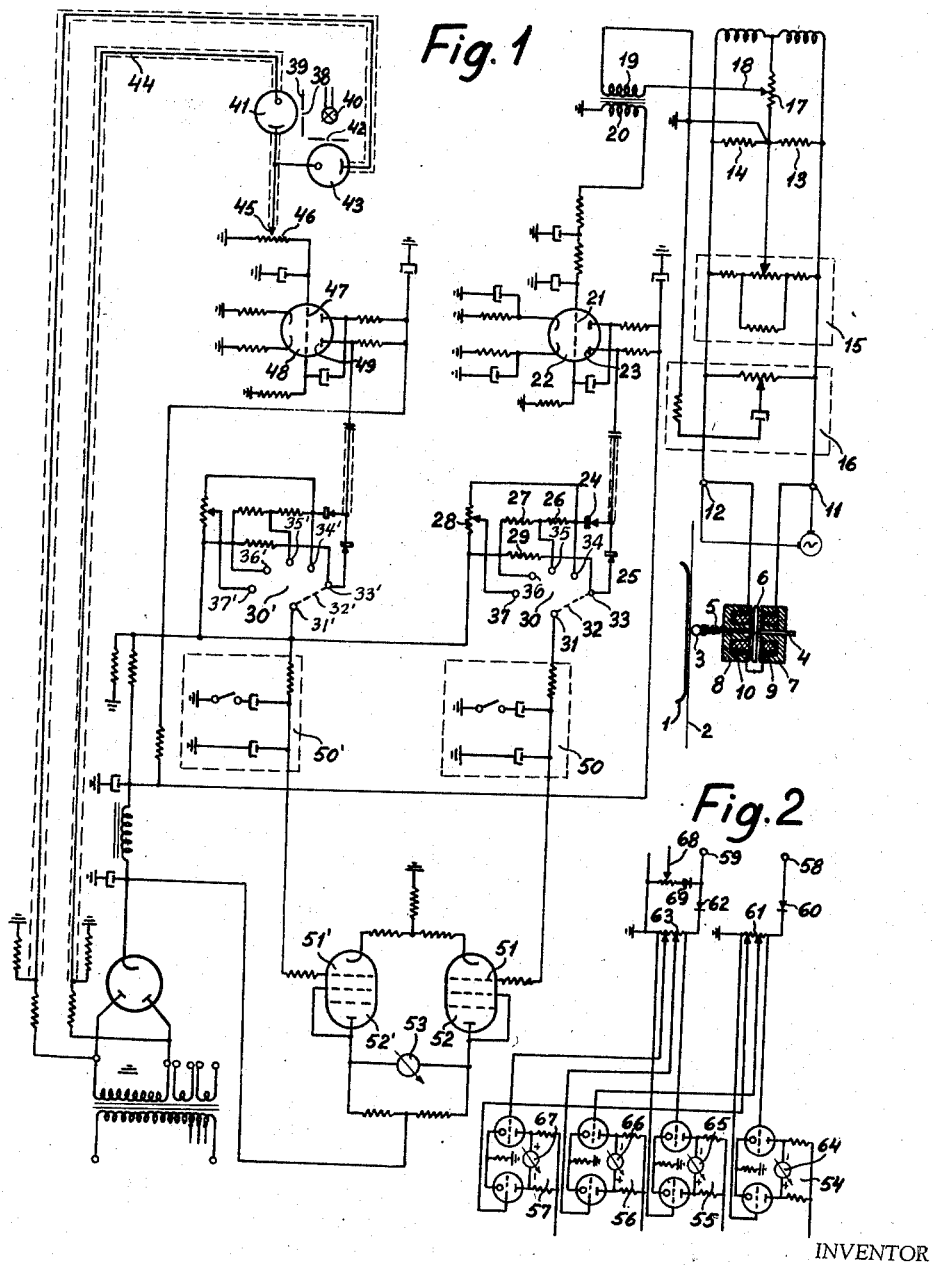

Sept. 17, 1957   J. C. H. C. J. BENDTSEN   2,806,373
APPARATUS FOR THE TESTING OF PAPER
Filed May 26, 1954

INVENTOR
Jens C. H. C. J. Bendtsen
BY Watson, Cole, Grindle + Watson
ATTORNEYS

United States Patent Office 2,806,373
Patented Sept. 17, 1957

2,806,373

APPARATUS FOR THE TESTING OF PAPER

Jens Christian Henrik Claudius Jagd Bendtsen,
Copenhagen, Denmark

Application May 26, 1954, Serial No. 432,567

Claims priority, application Denmark May 30, 1953

3 Claims. (Cl. 73—159)

This invention relates to an apparatus for the testing of paper. The apparatus is particularly intended for the checking of paper web during the production thereof in the paper mills, but it is also suitable for the testing of the final product at later stages of its life time, e. g. in printing mills, package factories, etc., where the paper is used.

Both in the production and in the use of paper there are quite a series of properties and characteristics of the paper on which it is important to keep a check. Among these are to be mentioned the gram weight, substance, moisture content, thickness, bulk, porosity, surface properties (smoothness), opacity, bottom and hardness.

As far as a number of these characteristics are concerned, a measurement can only be performed in the laboratory by relatively slow methods so that relatively long time will elapse before the results are available. On the other hand, some of the charactertstics lend themselves to practically instantaneous measurement. Among the latter characteristics are to be mentioned the thickness, that can be measured by means of a mechanical feeler or detector supplying electrical signals responsive to the thickness variations, and the opacity that can be measured by passing light through the paper.

As far as the former paper characteristcis are concerned it has been customary up to now only to obtain an average value from time to time. Thus, variations of the paper web within shorter length of the latter or in its transverse direction have been reflected only in measurements of the latter paper characteristics. This, however, is not fully satisfactory, seeing that to keep a complete check on a paper web, it is also important to know, how the properties not directly lending themselves to measurement vary within shorter lengths or in the transverse direction.

The present invention is based on the recognition that, with paper produced in a given paper mill from a given raw material, there exist such relations between the various paper characteristics that from a knowledge of some of these conclusions can be drawn regarding others.

The mere knowledge of this, however, does not form a sufficient basis for constructing an operative testing device for a greater number of paper characteristics than heretofore, because the relations between the various paper characteristics are of a very complex nature.

According to the invention, however, these difficulties are overcome by not principally considering the absolute values of the paper characteristics as such but rather their variations from the average level of the characteristics for a given paper web. Seeing that in the production of paper web it is always intended to keep the properties thereof as nearly constant as possible, or in other words to keep the variations thereof as small as possible, it has been found possible, according to the invention, within the measuring range of interest, to obtain a measuring accuracy satisfactory in practice by treating the test results in terms of their derivatives or differential coefficients whereby the mutual relations can be expressed in a much simpler way.

Thus, it has been found, according to the invention, that the variations of porosity and especially those of moisture can be obtained as simple algebraic functions of the variations of thickness and of substance, i. e. two properties that are readily available for direct measurement.

Similar relations may be found between other properties which it may be found desirable to include into the continuous testing of a paper web.

In using an apparatus according to the invention with a given paper mill and a given raw material information must first be gathered regarding the level of the various properties both those to be directly tested and those to be derived therefrom. and also regarding the factors of proportionality with which the directly tested properties should be multiplied in order to be combined to form the derived test results. This information may be gathered by measurements in the laboratory according to previously known methods or in accordance with a schedule prepared on the basis of the experience gathered in the course of time. When the level and the factors of proportionality have been determined, the apparatus will be capable through long periods of operation to register or record the paper properties correctly, because the variations of the test results are considered in relation to the level values determined, so that the apparatus will in fact show not only the variations of the paper properties but also the absolute values thereof. This is so, because the test results will also show displacements of the level since the latter are to be regarded as slow variations and are therefore correctly recorded.

One form of an apparatus according to the invention will in the following be described in further detail with reference to the accompanying drawing, showing a circuit diagram of the apparatus.

In the embodiment shown, the primary tests are directed to thickness variations and variations of gram weight or opacity. This is done by means of well known testing devices, and from the test results of the latter the apparatus develops linear algebraic functions representative of other paper characteristics, such as the moisture and the porosity.

The primary gram weight test is performed by means of a feeler having a support 1, across which a paper sheet or web 2 can be drawn. A ball 3 rests against the upper surface of the paper and is attached to a rod 4 which is biased by springs, diagrammatically shown at 5, so as to press the ball against the paper sheet at a predetermined force that may be adjustable, if desired. To the rod 4 there is attached an iron armature 6 playing between two cores of magnetic material 7 and 8, in which induction coils 9 and 10 respectively are mounted. The coils 9 and 10 form two branches of a Wheatstone-bridge, to which alternating current is supplied at terminals 11 and 12, the two other branches of the Wheatstone-bridge being formed by two equal resistors 13 and 14. 15 is a potentiometer device for adjusting the balance of the bridge, and 16 is a compensation device. These need not be described in detail, seeing that the arrangements in question are well known and do not form part of the present invention.

The balance branch of the Wheatstone-bridge is constituted by a resistance 17 of which a part, that can be varied by means of a tapping 18, is connected to the primary winding 19 of a transformer, the secondary winding 20 of which is connected to an input control grid 21 of a double amplifying valve 22. In the circuit of the output anode 23 of the latter there is arranged a rectifier system comprising two parallel branches, each containing a rectifier 24 and 25 respectively of opposite polarity. In series with the rectifier 24 there are connected two resistances 26 and 27 across the outer terminals of which a potentiometer 28 is shunted. A resistance 29 is connected in series with the rectifier 25. 30 is a change over switch having an output terminal 31, which by means of a switch arm 32 can be optionally connected to five different input terminals 33, 34, 35, 36, and 37 respectively. The terminal 35 is connected to the common point of the resistances 27 and 26 and the terminal 37 is connected to the potentiometer tapping of the resistance 28.

For testing the gram weight or the opacity, a testing device is used in which the paper strip 2 is moved past an opening 38 of a screen 39, through which opening light is thrown from a light source 40 onto a photo electric cell 41. The light source also throws light through an adjustable opening 42 directly onto a photo electric cell 43. The two photo electric cells are coupled against one another in a feeding circuit 44 which is symmetrical with respect to earth, and their common point is connected through a tapping 45 of a coupling resistance 46 to the input control grid 47 of a double amplifying valve 48 exactly similar to the amplifying valve 22. In the circuit of the output anode 49 of the valve 48 there is arranged a rectifier system exactly similar to that arranged in the output circuit of the valve 22. The rectifiers and resistances of this rectifying system are denoted by the same references as in the rectifying system previously described with the addition of a prime. Also to this rectifying system there is connected a change over switch which is denoted by 30′, and the various terminals of which bear the same references as those of the switch 30 with the addition of a prime.

The two terminals 31 and 31′ are connected through smoothing devices 50 and 50′ respectively to the control grids 51 and 51′ of a pair of push-pull valves 52 and 52′. A measuring or recording instrument 53 is connected in the common output circuit of the push-pull valves 52 and 52′.

The operation is as follows: Considering first the thickness variation detector it will be understood that at a certain thickness of the paper strip, the armature 6 will take up a symmetrical position between the cores of magnetic material 7 and 8, so that the coils 9 and 10 will have equal impedance values. Consequently, the Wheatstone-bridge will be in a state of balance so that no voltage is applied to the transformer 19 and no signal is transmitted through the subsequent amplifier and rectifier arrangement. In the case of departures from the said value of the thickness, the impedance values of the two coils 9 and 10 will be varied in opposite directions, so that the balance of the Wheatstone-bridge is disturbed and a voltage is developed across the primary winding 19. Consequently, a signal will be transmitted via the amplifying and rectifying arrangement which signal may be regarded as proportional to the thickness variations with sufficient accuracy. This signal is represented in various proportions on the various input terminals of the switch 30. These proportions may be determined in suitable manner by selecting suitable values of the resistances 26, 27 and 29. On the terminal 37 the signal is represented in a proportion which is continuously variable by means of the tapping of the potentiometer 28.

Considering thereafter the testing device for gram weight or opacity variations, it will be understood that the quantity of light which the photo electric cell 41 receives from the light source 40 will depend on the opacity of the zone of the paper strip 2 present opposite the opening 38, while the quantity of light received by the photo electric cell 43 only depends on the size of the opening 42. The opening 42 is smaller than the opening 38 and is adjusted in such a manner that the two photo electric cells receive equal quantities of light at a certain opacity of the paper strip preferably corresponding to the average value of the latter. In these circumstances no voltage is present at the point of connection between the two photo electric cells, and consequently no signal is transmitted through the amplifying and rectifying arrangement. In the case of departures from the average value, the balance is disturbed so that a signal is transmitted through the amplifying and rectifying system which signal can be regarded as proportional to the opacity or gram weight variations with sufficient accuracy. This signal is represented in different proportions on the terminals 33′—36′ and in a continuously variable proportion on the terminal 37′.

By means of the switches 30 and 30′, any of the terminals 33—37 and 33′—37′ respectively may be connected to the terminals 31 and 31′ respectively and thereby to the control grids 51 and 51′ respectively, and in the input circuit of the push-pull valves 52, 52′ a signal is thereby produced which is proportional to the difference between the signals occurring at the terminals 31 and 31′. In this manner, a series of a linear algebraic function of the primary signals may be obtained. The coefficients of the primary signals in these functions are determined by the resistances of the two rectifier arrangements. If the coefficient of one of the primary signals is selected equal to zero, by setting the relevant switch 30 or 30′ on the uppermost terminal 33 or 33′ respectively, the measuring or recording instrument 53 will measure or record the other primary signal. If, however, both switches are set at other terminals, both of the primary signals will be represented in the algebraic function recorded by the instrument 53. When suitably selecting the coefficients above mentioned, the result of the measuring can be made to represent other paper characteristics, particularly moisture and porosity variations. By means of the potentiometer resistances 28 and 28′ the coefficients may be adjusted continuously whereby other representative functions may be obtained in accordance with the experiences gathered in practice.

Also the adjustments to be given the potentiometers 17, 45, 28 and 28′ in order to obtain representative signals supply information regarding the character of the paper or paper mill.

The smoothing devices 50 and 50′ serve to cut off the fluctuations superposed on the variations. In the case where the results measured are recorded in the form of a graph, the presence of very high frequency fluctuations would disturb the picture and render the reading of the graphs more difficult. Also the adjustment to be given these smoothing devices in order to cut off the fluctuations supplies a certain information about the character of the paper, i. g. about its bottom.

The instrument 53 may, if desired, be a simple measuring instrument, but should preferably be a recording instrument on which the variations of the different paper characteristics are recorded in the form of graphs.

In the embodiment shown in Fig. 1, the same instrument 53 is used for all the paper characteristics to be measured. Thus, if it is desired to obtain concurrent graphs for the various paper characteristics, a strip must be run through the apparatus a number of times. It may then possibly be somewhat difficult to compare the various graphs.

However, the apparatus may also be constructed with a plurality of measuring or recording instruments so that a plurality of paper characteristics may be measured or recorded simultaneously. An example of this is shown in Fig. 2. In this figure, four pairs of push-pull valves 54, 55, 56, 57 are provided instead of the single pair shown in Fig. 1.

58 is a terminal that should be connected to the output anode of the valve 48 of Fig. 1, so that it will receive an alternating current signal which is proportional to the gram weight variations. Similarly, the terminal 59 should be connected to the output anode of the valve 22 of Fig. 1, so that it will receive a signal which is proportional to the thickness variations. To the terminal 58 there is connected a rectifier 60 with a series resistor 61 which will thus be present in the anode circuit of the valve 48. Similarly a rectifier 62 with a series resistance 63 are connected to the terminal 59 and thus form part of the anode circuit of the valve 22.

Now, the control grid of the push-pull valve pair 54 is connected across the whole of the resistance 61, so that in the output circuit of the push-pull valves, which contains a registering instrument 64, a signal will be produced which is proportional to the gram weight variations. Similarly the control electrodes of the push-pull stage 55 are connected across the whole of the resistance 63 so that the instrument 65 present in the output circuit of this push-pull stage will register a signal proportional to the thickness variations.

The push-pull stage 56 has one control grid thereof connected to a variable tapping of the resistance 61, while its other control grid is connected to a variable tapping of the resistance 63. Consequently, the measuring instrument 66 in the output circuit of this stage will register a signal proportional to the difference between the gram weight variations and the thickness variations, each multiplied by a constant which is adjusted by means of the potentiometer tappings of the resistances 61 and 63.

Finally the push-pull stage 57 is connected to the resistances 61 and 63 in the inverse manner by means of further potentiometer tappings, so that the measuring instrument 67 in the output circuit of this stage will register a signal proportional to the difference between the thickness variations and the gram weight variations, each multiplied by adjustable coefficients.

The number of push-pull stages with measuring instruments may be increased at will, so that further algebraic functions may be obtained. If functions are desired in which an addition of the gram weight and thickness variations is performed this may be obtained by means of a variable tapping of a resistance 68 connected in series with a rectifier 69 having a polarity opposite to that of the rectifier 62.

If all the measuring instruments 64-67 are recording instruments, a simultaneous recording of the various paper characteristics may be obtained.

Instead of or in addition to the measuring or recording function, the output signals may also be used to perform adjustments of the paper mill by means of suitable servomotors.

I claim:

1. An apparatus for the testing of sheet paper comprising at least two detectors continuously responsive to thickness and opacity variations respectively of a sheet of paper moving therepast and adapted to supply primary electric signals representative of the variations of said characteristics from a certain level value, circuit means connected to said detectors for developing from said primary signals derived signals, means to adjust the ratio of the magnitude of at least one of said derived signals to the magnitude of its primary signal, circuit means for balancing said derived signals against one another to form secondary signals representative of linear combinations of said primary signals, and means for registering said primary and said secondary signals.

2. An apparatus as claimed in claim 1 wherein the detector responsive to thickness variations comprises an armature symmetrically disposed between cores of magnetic material, impedance coils disposed about said cores, a Wheatstone bridge including said coils as arms thereof whereby a bridge unbalance voltage is produced when said coils are not of equal impedance value, a transformer to which said voltage is applied, and an amplifier and rectifier arrangement whereby thickness variations are signalled.

3. An apparatus as claimed in claim 2 wherein the detector responsive to opacity variations comprises two electric cells so constructed and arranged that voltage is conducted between said cells when unequal quantities of light are received by said cells, a source of light arranged to pass light through the sheet of paper under test onto one of the two electric cells and to pass a reference quantity of light directly onto the other cell, and an amplifier and rectifier arrangement activated by said voltage whereby opacity variations are signalled.

References Cited in the file of this patent

UNITED STATES PATENTS

| Number | Name | Date |
| --- | --- | --- |
| 921,083 | Chaney | May 11, 1909 |
| 955,988 | Osburn | Apr. 26, 1910 |
| 1,913,120 | Kenyon | June 6, 1933 |
| 2,392,010 | Stevens | Jan. 1, 1946 |
| 2,466,615 | Rusca | Apr. 5, 1949 |
| 2,674,127 | Garrett | Apr. 6, 1954 |
| 2,688,878 | Kolish | Sept. 14, 1954 |